United States Patent [19]

Standley

[11] 4,362,200

[45] Dec. 7, 1982

[54] PNEUMATIC TIRE

[75] Inventor: Paul M. Standley, Springfield, Mo.

[73] Assignee: Dayco Corporation, Dayton, Ohio

[21] Appl. No.: 198,884

[22] Filed: Oct. 20, 1980

[51] Int. Cl.³ ............. B60C 19/06; C01B 31/04; C08K 9/00
[52] U.S. Cl. ................. 152/153; 152/330 C; 152/353 R; 152/360; 152/374; 423/448; 260/763; 524/571
[58] Field of Search ............ 152/153, 330 R, 330 C, 152/353 R, 357, 360, 374, DIG. 2; 423/448; 260/42.32, 42.33, 42.44, 42.47, 763; 156/272

[56] References Cited

U.S. PATENT DOCUMENTS

| 1,769,694 | 7/1930 | Jenkinson | 152/153 |
| 1,836,468 | 12/1931 | Hicks et al. | 152/153 |
| 4,013,760 | 3/1977 | Huschka et al. | 423/448 |
| 4,236,563 | 12/1980 | Moers et al. | 152/374 |

FOREIGN PATENT DOCUMENTS 1755301 8/1971 Fed. Rep. of Germany ... 152/209 R

Primary Examiner—Edward C. Kimlin
Assistant Examiner—Lois E. Boland
Attorney, Agent, or Firm—Joseph V. Tassone

[57] ABSTRACT

A pneumatic tire having a layer of heat-conducting elastomeric material between an inner carcass and tread assembly, and adjacent a heat conducting position of each sidewall, the layer and the portion dissipating heat from an internal area of the tire to external areas.

3 Claims, 1 Drawing Figure

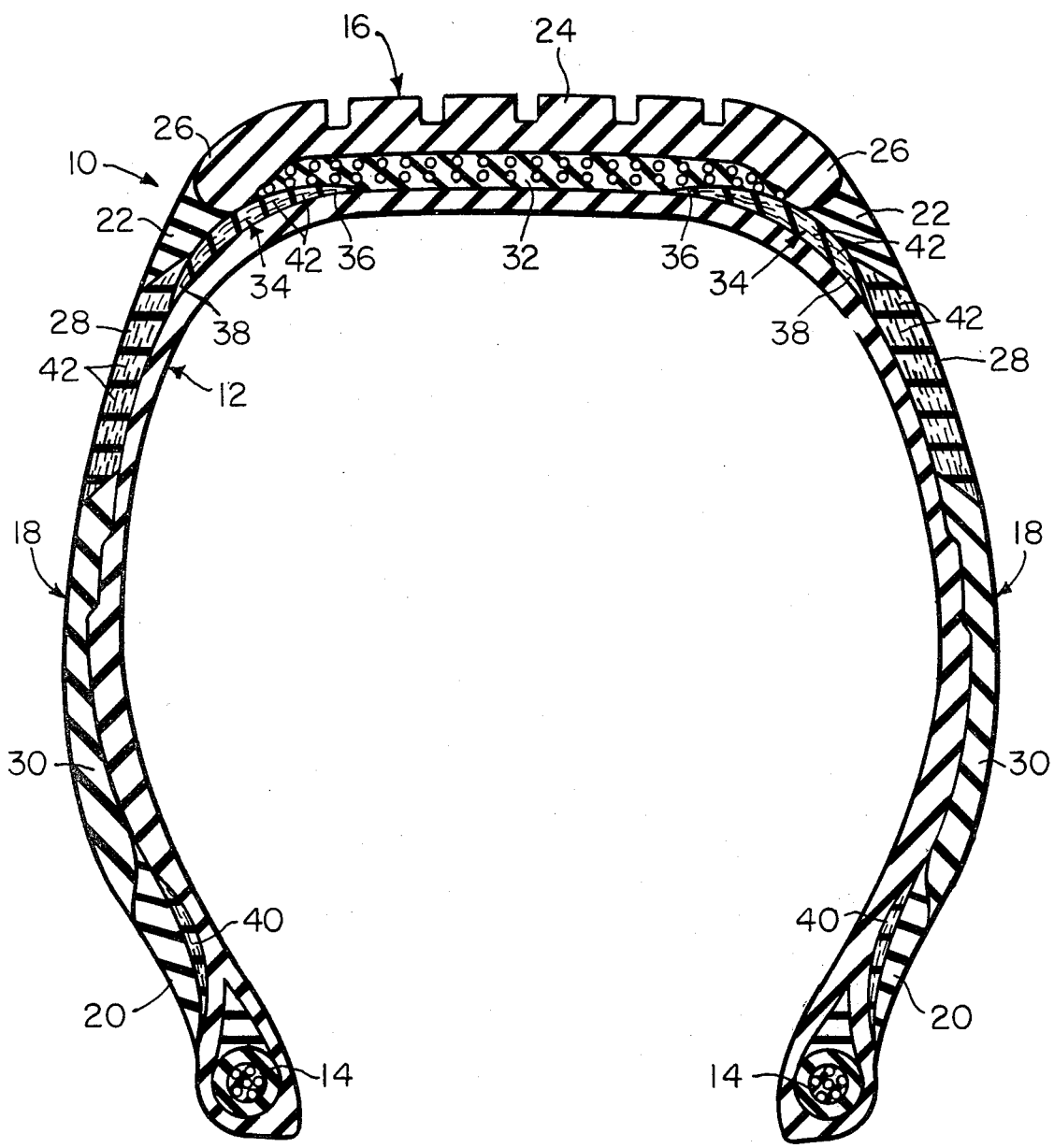

4,362,200

PNEUMATIC TIRE

BACKGROUND OF THE INVENTION

This invention relates to tires and particularly to pneumatic tires having an annular reinforcement between the tread and the carcass.

The generation of heat in rubber or rubber-like articles due to repeated flexing has long been a problem. Undesired heat generation in pneumatic tires can lead to premature failure of the tire, generally by way of delamination of the various components of the tire.

In the past, heat buildup in pneumatic tires has been controlled by varying the relative amounts of the components in the recipes for the various parts of such tires. Such a technique often resulted in other desireable properties being adversely affected.

It has now been found that heat buildup in a pneumatic tire can be decreased by simply conducting the heat to an outer dissipative surface of the tire.

Accordingly, it is an object of the present invention to provide a pneumatic tire characterized by its exhibiting a low heat buildup.

Other objects, aspects and advantages of the present invention will be apparent to those skilled in the art from a reading of the following disclosure and the appended claims.

BRIEF DESCRIPTION OF THE DRAWING

In the drawing,

FIG. 1 is a radial cross-section of the tire of this invention.

SUMMARY OF THE INVENTION

In accordance with the present invention there is provided a novel pneumatic tire construction which comprises at least one layer of a heat-conducting elastomeric material disposed within the body of the tire in such a manner that this layer acts as a conduit for conducting heat to an outside surface of the tire.

DESCRIPTION OF THE DRAWING

Referring now to the drawing, the tire of this invention is indicated generally by the reference numeral 10. The tire 10 comprises an outer assembly and an inner carcass assembly 12 which terminates in a pair of bead assemblies 14. The inner carcass assembly 12 and the bead assemblies 14 are conventional in the tire art and will not be further described.

The outer assembly comprises a tread assembly 16, a pair of sidewall assemblies 18, a pair of rim strips 20 and a pair of sidewall-to-shoulder strips 22. The tread assembly 16 comprises a road-gripping portion 24 located between a pair of shoulder portions 26. Each side-wall assembly 18 comprises an outer sidewall portion 28 and an inner sidewall portion 30. The rim strips 20 are located between each bead assembly 14 and the associated sidewall assembly 18. The shoulder-to-sidewall strips 22 are located between each shoulder portion 26 and the associated sidewall assembly 18.

The tire 10 also comprises an annular reinforcing assembly 32 disposed between the tread assembly 16 and the radially outermost surface of the inner carcass assembly 12.

The tire 10 further comprises a layer 34 of a heat-conducting elastomeric material disposed between the inner carcass assembly 12 and the tread assembly 16, with one side portion 36 of the layer 34 in contact with the reinforcing assembly 32 and the opposite side portion 38 of the layer 34 in contact with the outer sidewall portion 28 of the sidewall assembly 18. In the illustrative embodiment shown, a mid-portion of the layer 34 is in contact with the sidewall-to-shoulder strip 22.

The outer sidewall portion 28 is also made of a heat-conducting material. Thus, the heat-conducting layer 34 functions to withdraw heat generated at the reinforcing assembly 32 and conduct this heat to the heat-dissipative sidewall portion 28.

According to another embodiment of the present invention, the tire 10 has a layer 40 of heat-conducting elastomeric material disposed between the inner carcass assembly 12 and the rim strip 20.

The heat-conducting elastomeric material of layer 34, the outer sidewall portion 28 and the optional layer 40 is an elastomeric material having a pyrolytic graphite homogeneously dispersed therethrough. The heat-conducting elastomeric material is made by uniformly dispersing a heat-conducting amount, generally from about 5 to about 50 parts by weight, of a pyrolytic graphite throughout 100 parts by weight of a desired elastomeric material. The elastomer/pyrolytic graphite mixture is then calendered to orient a substantial portion of the pyrolytic graphite particles. A few such oriented pyrolytic graphite particles are indicated generally by the reference numeral 42.

The tire 10 is made primarily of elastomeric material and this elastomeric material may be any material, natural or synthetic, having desireable elastomeric properties. Examples of such materials include natural rubber, polychloroprene, polybutadiene, styrene-butadiene rubber, acrylonitrile butadiene copolymer, polyisoprene, and the like, and blends thereof.

Pyrolytic graphite is a synthetic graphite and, preferably, has a carbon content of at least 95% and a thermal conductivity of at least 75 watts per m° K.

The heat-conducting elastomeric material can also contain, in addition to the elastomer and the pyrolytic graphite, other well known components such as vulcanizing agents, carbon black, extender oil, fillers, accelerators, antioxidants, antiozonants, and the like. Such components and their proportions are well known in the art and will not be further discussed for the purpose of brevity.

The building up of the tire 10 and subsequent curing or vulcanization of the tire are carried out using procedures well known in the art. During the building step, the layer 34, the outer sidewall portion 28, and the layer 40 are laid up so that the direction of orientation of the oriented pyrolytic graphite particles in the heat-conducting elastomeric material is radial with respect to the toroid of the tire.

While the preferred embodiment of the present invention has been shown and described herein, it is obvious that many modifications may be made therein without departing from the spirit and scope of the present invention.

I claim:

1. In a pneumatic tire construction made primarily of elastomeric materials and comprising: an inner carcass assembly terminating in a pair of bead assemblies; an outer assembly comprising a tread assembly having a pair of shoulder portions and a road-gripping portion therebetween, a pair of sidewall assemblies, a rim strip between each of said bead assemblies and said sidewall assemblies, a sidewall-to-shoulder strip between each of said sidewall assemblies and said shoulder portions, and an annular reinforcing assembly disposed between said tread assembly and the radially outermost surface of said inner carcass assembly; the improvement comprising opposite layers of heat-conducting elastomeric material disposed between said inner carcass assembly and said tread assembly, said sidewall assemblies having outer portions also comprising heat-conducting elastomeric material, each of said opposite layers having one side portion thereof in contact with said reinforcing assembly and an opposite side portion thereof in contact with one of said outer portions of said sidewall assemblies, said opposite layers and said outer portions cooperating to conduct heat from an internal area in said tire to external areas of heat dissipation, said heat-conducting elastomeric material comprising an elastomer having a heat-conducting amount of particles of pyrolytic graphite homogeneously dispersed therethrough, said heat-conducting elastomeric material being a calendered material so that a substantial portion of said particles of graphite are oriented in one direction, said layer and said outer portions being disposed in said tire so that said direction of orientation of the oriented pyrolytic graphite particles is generally radial with respect to the toroid of the tire and extends generally from said internal area in said tire to said external areas of heat dissipation.

2. The tire of claim 1 wherein the amount of said pyrolytic graphite ranges from about 5 to about 50 parts by weight per 100 parts by weight of elastomer.

3. The tire of claim 1 additionally comprising a layer of said heat-conducting elastomeric material disposed between said inner carcass assembly and said rim strip, each said layer of said heat conducting elastomeric material being completely embedded within said tire construction.

* * * * *